US011269150B2

(12) United States Patent
Smrha et al.

(10) Patent No.: US 11,269,150 B2
(45) Date of Patent: Mar. 8, 2022

(54) ADAPTER PANEL WITH LATERAL SLIDING ADAPTER ARRAYS

(71) Applicant: CommScope Technologies LLC, Hickory, NC (US)

(72) Inventors: Mark Smrha, West Chicago, IL (US); Hutch Coburn, Eden Prairie, MN (US); Chad James Sjodin, Savage, MN (US)

(73) Assignee: CommScope Technologies LLC, Hickory, NC (US)

( * ) Notice: Subject to any disclaimer, the term of this patent is extended or adjusted under 35 U.S.C. 154(b) by 129 days.

(21) Appl. No.: 16/851,587

(22) Filed: Apr. 17, 2020

(65) Prior Publication Data

US 2020/0241228 A1    Jul. 30, 2020

Related U.S. Application Data

(63) Continuation of application No. 16/675,883, filed on Nov. 6, 2019, now Pat. No. 10,969,553, which is a
(Continued)

(51) Int. Cl.
*G02B 6/00* (2006.01)
*G02B 6/44* (2006.01)
(Continued)

(52) U.S. Cl.
CPC ......... *G02B 6/4446* (2013.01); *G02B 6/3897* (2013.01); *G02B 6/444* (2013.01);
(Continued)

(58) Field of Classification Search
CPC .. G02B 6/4446; G02B 6/3825; G02B 6/3897; G02B 6/4455; G02B 6/4452; G02B 6/00;
(Continued)

(56) References Cited

U.S. PATENT DOCUMENTS 4,765,710 A   8/1988   Burmeister et al.
5,129,030 A   7/1992   Petrunia
(Continued)

FOREIGN PATENT DOCUMENTS

EP   0 341 027 A2   11/1989
EP   1 603 345 A2   12/2005
(Continued)

OTHER PUBLICATIONS

ADC Telecommunications Fiber Outside Plant Systems, 4 pgs.; Aug. 1998.
(Continued)

*Primary Examiner* — Jennifer Doan
(74) *Attorney, Agent, or Firm* — Merchant & Gould P.C.

(57) ABSTRACT

An adapter panel arrangement including a chassis and a panel of adapters. The adapters defining rearward cable connections and forward cable connections of the panel arrangement. Openings permitting access to the rearward and forward cable connections of the adapters are provided. The chassis further including a removable rear chassis portion to provide access to cable routing areas within the chassis interior.

20 Claims, 10 Drawing Sheets

Related U.S. Application Data continuation of application No. 16/272,349, filed on Feb. 11, 2019, now Pat. No. 10,473,874, which is a continuation of application No. 15/997,852, filed on Jun. 5, 2018, now Pat. No. 10,203,464, which is a continuation of application No. 15/645,464, filed on Jul. 10, 2017, now Pat. No. 9,995,897, which is a continuation of application No. 14/813,955, filed on Jul. 30, 2015, now Pat. No. 9,703,059, which is a continuation of application No. 14/515,182, filed on Oct. 15, 2014, now Pat. No. 9,097,871, which is a continuation of application No. 13/722,373, filed on Dec. 20, 2012, now Pat. No. 8,867,884, which is a continuation of application No. 12/930,782, filed on Jan. 14, 2011, now Pat. No. 8,346,044, which is a continuation of application No. 12/460,162, filed on Jul. 13, 2009, now Pat. No. 7,873,253, which is a continuation of application No. 11/715,258, filed on Mar. 6, 2007, now Pat. No. 7,570,861, which is a continuation-in-part of application No. 11/655,760, filed on Jan. 19, 2007, now Pat. No. 7,570,860.

(51) Int. Cl.
  *G02B 6/38* (2006.01)
  *H04Q 1/02* (2006.01)
  *H04Q 1/06* (2006.01)
  *H04Q 1/14* (2006.01)

(52) U.S. Cl.
  CPC ......... *G02B 6/4452* (2013.01); *G02B 6/4455* (2013.01); *H04Q 1/023* (2013.01); *H04Q 1/06* (2013.01); *H04Q 1/142* (2013.01)

(58) Field of Classification Search
  CPC ...... H04Q 11/0003; H04Q 1/023; H04Q 1/06; H04Q 1/142
  See application file for complete search history.

(56) References Cited

U.S. PATENT DOCUMENTS

| | | | |
|---|---|---|---|
| 5,167,001 A | 11/1992 | Debortoli et al. | |
| 5,420,958 A | 5/1995 | Henson et al. | |
| 5,497,444 A | 3/1996 | Wheeler | |
| 5,613,030 A | 3/1997 | Hoffer et al. | |
| 5,717,810 A | 2/1998 | Wheeler | |
| 5,758,003 A | 5/1998 | Wheeler et al. | |
| 5,778,131 A | 7/1998 | Liewellyn et al. | |
| 6,195,493 B1 | 2/2001 | Bridges | |
| 6,385,381 B1 | 5/2002 | Janus et al. | |
| 6,504,988 B1 | 1/2003 | Trebesch et al. | |
| 6,560,114 B2 | 5/2003 | Berry et al. | |
| 6,591,051 B2 | 7/2003 | Solheid et al. | |
| 6,627,812 B2 | 9/2003 | Kim et al. | |
| 6,715,619 B2 | 4/2004 | Kim et al. | |
| 6,752,665 B2 | 6/2004 | Kha et al. | |
| 6,760,531 B1 | 7/2004 | Solheid et al. | |
| 6,804,447 B2 | 10/2004 | Smith et al. | |
| 6,854,894 B1 | 2/2005 | Yunker et al. | |
| 6,920,274 B2 | 7/2005 | Rapp et al. | |
| 6,937,807 B2 | 8/2005 | Franklin et al. | |
| 6,944,383 B1 | 9/2005 | Herzog et al. | |
| 7,094,095 B1 | 8/2006 | Caveney | |
| 7,171,099 B2 | 1/2007 | Barnes et al. | |
| 7,194,181 B2 | 3/2007 | Holmberg et al. | |
| 7,200,316 B2 | 4/2007 | Giraud et al. | |
| 7,257,223 B2 | 8/2007 | Sajadi et al. | |
| 7,273,320 B2 | 9/2007 | Ellis et al. | |
| 7,318,751 B2 | 1/2008 | Erdman et al. | |
| 7,376,322 B2 | 5/2008 | Zimmel et al. | |
| 7,409,137 B2 | 8/2008 | Barnes | |
| 7,474,828 B2 | 1/2009 | Leon et al. | |
| 7,542,649 B1 | 6/2009 | Andersen | |
| 7,570,860 B2 | 8/2009 | Smrha et al. | |
| 7,570,861 B2 | 8/2009 | Smrha et al. | |
| 7,590,328 B2 | 9/2009 | Reinhardt et al. | |
| 7,689,089 B2 | 3/2010 | Wagner et al. | |
| 7,873,252 B2 | 1/2011 | Smrha et al. | |
| 7,873,253 B2 | 1/2011 | Smrha et al. | |
| 8,009,954 B2 | 8/2011 | Bran de Leon et al. | |
| 8,179,684 B2 | 5/2012 | Smrha et al. | |
| 8,340,490 B2 | 12/2012 | Smrha et al. | |
| 8,346,044 B2 | 1/2013 | Smrha et al. | |
| 8,452,148 B2 | 5/2013 | Cooke et al. | |
| 8,538,226 B2 | 9/2013 | Makrides-Saravanos et al. | |
| 8,690,593 B2 * | 4/2014 | Anderson | G02B 6/3879 439/326 |
| 8,867,884 B2 | 10/2014 | Smrha et al. | |
| 8,879,881 B2 | 11/2014 | Cote et al. | |
| 8,953,921 B2 | 2/2015 | Smrha et al. | |
| 8,991,950 B2 | 3/2015 | Privitera et al. | |
| 9,097,871 B2 | 8/2015 | Smrha et al. | |
| 9,223,094 B2 * | 12/2015 | Schneider | G02B 6/3885 |
| 9,329,353 B2 * | 5/2016 | Solheid | G02B 6/4471 |
| 9,429,714 B2 | 8/2016 | Holmberg | |
| 9,435,974 B2 | 9/2016 | Smrha et al. | |
| 9,435,976 B2 | 9/2016 | Smrha et al. | |
| 9,448,378 B2 | 9/2016 | Smrha et al. | |
| 9,448,379 B2 | 9/2016 | Smrha et al. | |
| 9,488,796 B2 | 11/2016 | Smrha et al. | |
| 9,638,879 B2 | 5/2017 | Smrha et al. | |
| 9,638,880 B2 | 5/2017 | Smrha et al. | |
| 9,645,342 B2 | 5/2017 | Smrha et al. | |
| 9,661,787 B2 | 5/2017 | Hall et al. | |
| 9,690,066 B2 | 6/2017 | Smrha et al. | |
| 9,703,059 B2 | 7/2017 | Smrha et al. | |
| 9,709,764 B2 | 7/2017 | Smrha et al. | |
| 9,995,897 B2 | 6/2018 | Smrha et al. | |
| 10,203,464 B1 | 2/2019 | Smrha et al. | |
| 10,310,204 B2 | 6/2019 | Smrha et al. | |
| 10,473,874 B2 | 11/2019 | Smrha et al. | |
| 2003/0174996 A1 | 9/2003 | Henschel et al. | |
| 2003/0223723 A1 | 12/2003 | Massey et al. | |
| 2004/0086252 A1 | 5/2004 | Smith et al. | |
| 2006/0261015 A1 | 11/2006 | Blackwell | |
| 2006/0275008 A1 | 12/2006 | Xin | |
| 2008/0025683 A1 | 1/2008 | Murano | |
| 2008/0037209 A1 | 2/2008 | Niazi et al. | |
| 2009/0129033 A1 | 5/2009 | Smrha et al. | |
| 2009/0214171 A1 | 8/2009 | Coburn et al. | |
| 2011/0267794 A1 | 11/2011 | Anderson et al. | |
| 2011/0317971 A1 | 12/2011 | Zhang et al. | |
| 2011/0317974 A1 | 12/2011 | Krampotich et al. | |
| 2015/0131958 A1 | 5/2015 | Smrha et al. | |
| 2015/0286021 A1 | 10/2015 | Smrha et al. | |
| 2015/0331214 A1 | 11/2015 | Smrha et al. | |
| 2015/0331215 A1 | 11/2015 | Smrha et al. | |
| 2015/0331216 A1 | 11/2015 | Smrha et al. | |
| 2015/0338593 A1 | 11/2015 | Smrha et al. | |
| 2015/0338594 A1 | 11/2015 | Smrha et al. | |
| 2015/0338595 A1 | 11/2015 | Smrha et al. | |
| 2015/0338597 A1 | 11/2015 | Smrha et al. | |
| 2015/0338598 A1 | 11/2015 | Smrha et al. | |
| 2015/0338599 A1 | 11/2015 | Smrha et al. | |

FOREIGN PATENT DOCUMENTS

| | | |
|---|---|---|
| JP | 2002-82230 | 3/2002 |
| KR | 20060111757 A | 10/2006 |

OTHER PUBLICATIONS

ADC Telecommunications Fiber Panel Products, Second Edition, 6 pgs.; Jul. 1996.

APA Cable & Networks Unveils 288-Port Fiber Distribution Panel for Central Office Use; Customizable Fiber Cable Panel is One of Densest in the Industry; Modular Design Allows Telcos, CLECs, MSOs to Expand Capacity as Needed, PR Newswire (New York), Jun. 20, 2006, 3 Pages.

(56) References Cited

OTHER PUBLICATIONS

Cabinets, Racks, Panels, and Associated Equipment, EIA/ECA Standard, EIA/ECA-310-E, 26 pages (Dec. 2005).
Corning Cable Systems; "Jumper Routing Procedure for Enhanced Management Frame"; Issue 2; dated Apr. 2002; 4 pgs.
Drawing of ADC Telecommunications Drawer, 1 page; Aug. 2006.
Drawing of ADC Telecommunications Drawer, 2 pages, Nov. 2006.
FOCIS 10, Fiber Optic Connector Intermateability Standard—Type LC, TIA/EIA Standard, TIA/EIA-604-10A, 36 pages (Mar. 2002).
FONS Introduces Family of Rack Mount Splice Shelves; A Natural Extension to FONS' Suite of High-Density Products for Complete Fiber-to-the-'X' Solutions, Business/Technology Editors Optical Fiber Communications 2002, Business Wire (New York), Apr. 3, 2002, 3 Pages.
LC Connector Products (Fiber), The Siemon Company, Feb. 2000, 4 Pages.
Lightwave—Fiber remains medium of choice for data center applications, www.lightwaveonline.com; Apr. 1, 2007, 5 Pages.
McCreary, Scott A. et al.. Increasing rack capacity: An ongoing challenge, Fiberoptic Product News 16.5, May 2001, 7 Pages.
SYSTIMAX Solutions, "SYSTIMAX G2 Fiber-Optic Connectivity Solution," Jun. 2005 (10 pgs).
SYSTIMAX Solutions, "SYSTIMAX InstaPATCH Plus Modular Shelf and DM2 Modules," Jun. 2005 (3 pgs).
SYSTIMAX Solutions, "SYSTIMAX InstaPATCH System," Aug. 2004 (7 pgs).
SYSTIMAX Solutions, "The SYSTIMAX 110 VisiPatch System—Clearly the Way Ahead," May 2004 (3 pgs).
SYSTIMAX Solutions, "The SYSTIMAX iPatch System," Jun. 2004 (8 pgs).
2005 Product Catalog, CommScope Europe, S.PR.L., 13 pages (Nov. 2004).
2006 European Product Catalog, Fiber Optic Cabling, Tyco Electronics AMP GmbH, 11 pages (Copyright 2005).
2007 Solutions Catalog, CommScope, Inc., 27 pages (Feb. 2007).
2008 Product Catalog, CommScope, Inc., 29 pages (Copyright 2008).
Cable Management Tray Panels, ADC, 8 pages (Mar. 2004).
Fiber Optic Panels, 1st Edition, ADC Telecommunications, Inc., 93 pages (Oct. 2007).
Fiber Optic Products, Lucent Technologies, 46 pages (Jun. 1997).
Fiber Optic Products, Lucent Technologies, 62 pages, Issue 8 (Sep. 1999).
OmniReach™ FTTP Solutions, ADC Telecommunications, Inc.,12 pages, (Apr. 2004).
OMX™ VAM (Value-Added Module) User Manual, ACDP-90-281, Issue 1, pp. 1-8 (Nov. 2000).
SYSTIMAX® InstaPATCH™ MP-1U Termination Panel Installation Using InstaPATCH Plus Modules (for Indoor Use Only), Issue 1, pp. 1-6 (May 2005).
SYSTIMAX® InstaPATCH® Plus Modular Shelf and DM2 Modules, CommScope, Inc., pp. 1-4 (Oct. 2007).
SYSTIMAX Solutions Catalog, CommScope, Inc., 32 pages (Sep. 2005).
SYSTIMAX Solutions Catalog, CommScope, Inc. 19 pages (Copyright 2008).
2007 Uniprise Catalog, CommScope, 31 pages (2007).
Value-Added Module (VAM) System: Monitor, Splitter, WDM and CWDM Modules and Chassis for Switching Office, Central Exchange and Headend Applications, 1st Edition, ADC Telecommuncations, Inc., 36 pages (Feb. 2008).
Value-Added Module (VAM) System: Monitor, Splitter, WDM and CWDM Modules and Chassis, 4th Edition, ADC Telecommunications, Inc., 32 pages (Mar. 2007).
Value-Added-Module (VAM) System: Unmatched Functionality and Flexibility, 4th Edition, ADC Telecommunications, Inc., 35 pages, (Mar. 2006).

* cited by examiner

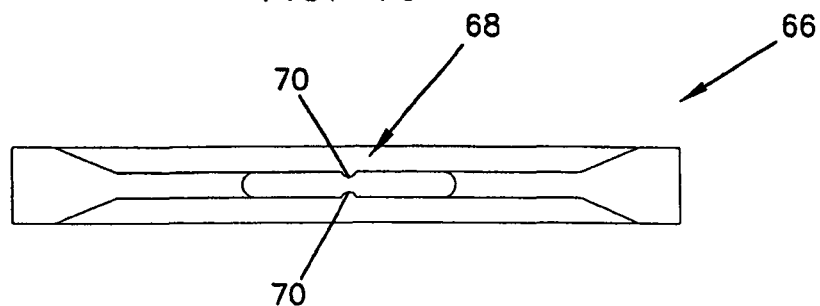
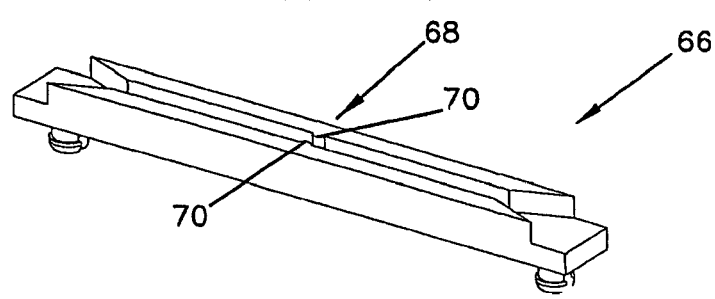
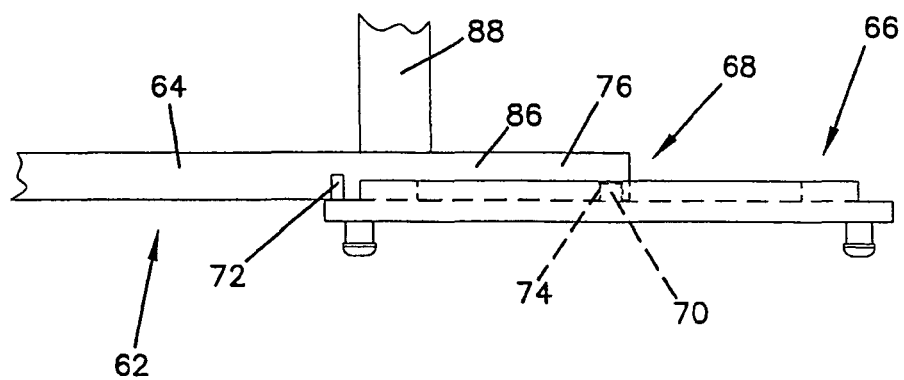

ADAPTER PANEL WITH LATERAL SLIDING ADAPTER ARRAYS

CROSS-REFERENCE TO RELATED APPLICATIONS

This application is a continuation of application Ser. No. 16/675,883, filed Nov. 6, 2019, which is a continuation of application Ser. No. 16/272,349, filed Feb. 11, 2019, now U.S. Pat. No. 10,473,874, which is a continuation of application Ser. No. 15/997,852, filed Jun. 5, 2018, now U.S. Pat. No. 10,203,464, which is a continuation of application Ser. No. 15/645,464, filed Jul. 10, 2017, now U.S. Pat. No. 9,995,897, which is a continuation of application Ser. No. 14/813,955, filed Jul. 30, 2015, now U.S. Pat. No. 9,703,059, which is a continuation of application Ser. No. 14/515,182, filed Oct. 15, 2014, now U.S. Pat. No. 9,097,871, which is a continuation of application Ser. No. 13/722,373, filed Dec. 20, 2012, now U.S. Pat. No. 8,867,884, which is a continuation of application Ser. No. 12/930,782, filed Jan. 14, 2011, now U.S. Pat. No. 8,346,044, which is a continuation of application Ser. No. 12/460,162, filed Jul. 13, 2009, now U.S. Pat. No. 7,873,253, which is a continuation of application Ser. No. 11/715,258, filed Mar. 6, 2007, now U.S. Pat. No. 7,570,861, which is a continuation-in-part of application Ser. No. 11/655,760, filed Jan. 19, 2007, now U.S. Pat. No. 7,570,860, which applications are incorporated herein by reference in their entirety.

FIELD

This disclosure relates to devices for use in the telecommunications industry, and associated methods. More specifically, this disclosure relates to a termination panel for use in the telecommunications industry, and methods associated with termination panels.

BACKGROUND

Many local area networks and telecommunication systems utilize termination panels to provide cross-connections between telecommunications equipment. Demand for greater telecommunication services has prompted the increase in circuit densities of termination panels. Notwithstanding the advances made in the art, there is a continuous need for further advances to improve upon high-density termination panels and associated methods. Improvements are needed, for example, to enhance termination access and cable management associated with installation, maintenance, repair, upgrade, and cross-connection procedures related to termination panels.

SUMMARY

The present disclosure relates to an adapter panel arrangement including a chassis and a panel of adapters. The adapters define open rearward cable connections and open forward cable connections of the panel arrangement. The adapters are arranged in arrays that slide independently of other arrays to provide access to the open rearward and open forward cable connections. Access to the connections is further provided by removable access panels attached to the top wall of the chassis and bottom access openings formed in a sliding drawer. Access to the interior region of the chassis is provided by a removable rear chassis wall.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 10 is a side elevation view of one embodiment of a guide of the adapter panel arrangement of FIG. 1, shown in isolation;

FIG. 11 is a bottom perspective view of the guide of FIG. 10;

FIG. 12 is a top plan view of the guide of FIG. 10, and a portion of the sliding frame piece of FIG. 9;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
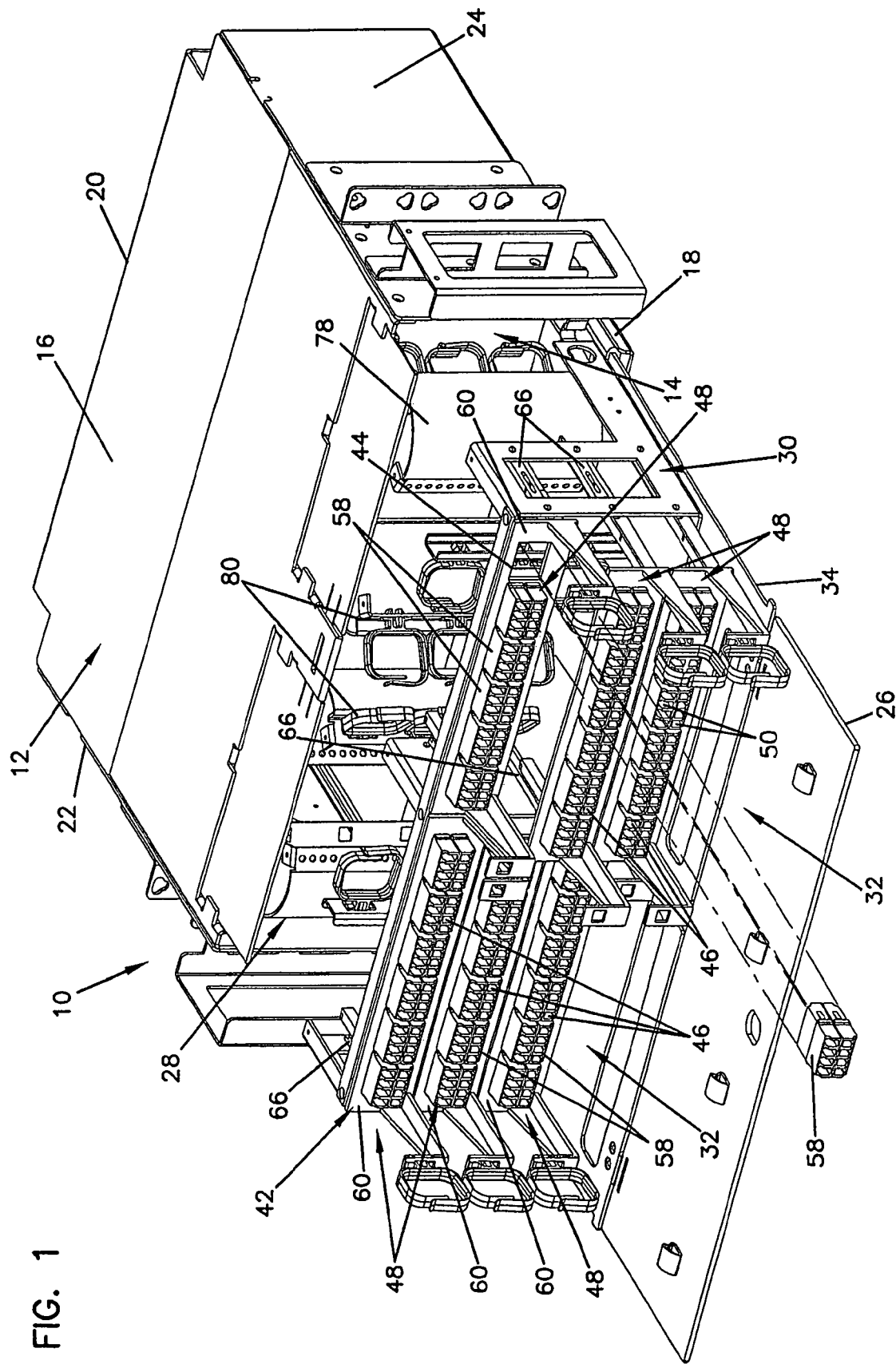
FIG. 1 is a front perspective view of one embodiment of an adapter panel arrangement, in accordance with the principles disclosed, shown with a drawer of the adapter panel arrangement in an open position.

FIG. 1 illustrates a distribution frame or adapter panel arrangement 10 in accordance with the principles disclosed. The adapter panel arrangement 10 is designed to provide a high density of cable terminations, yet facilitate access to the cable terminations from the rear during installation procedures, and from the front during post-installation procedures.

Figure 2:
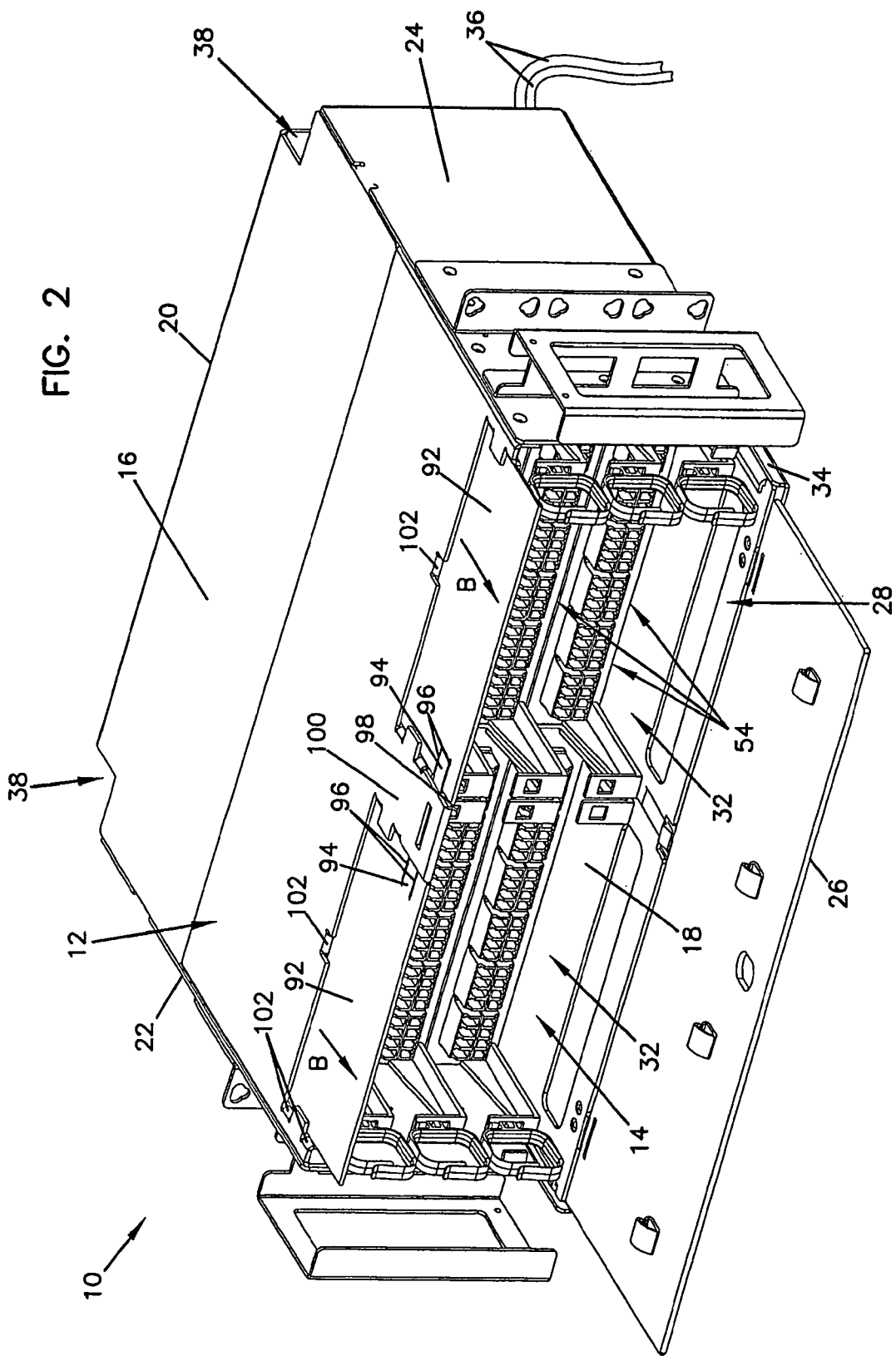
FIG. 2 is a front perspective view of the adapter panel arrangement of FIG. 1, shown with the drawer in a closed position.
Figure 3:
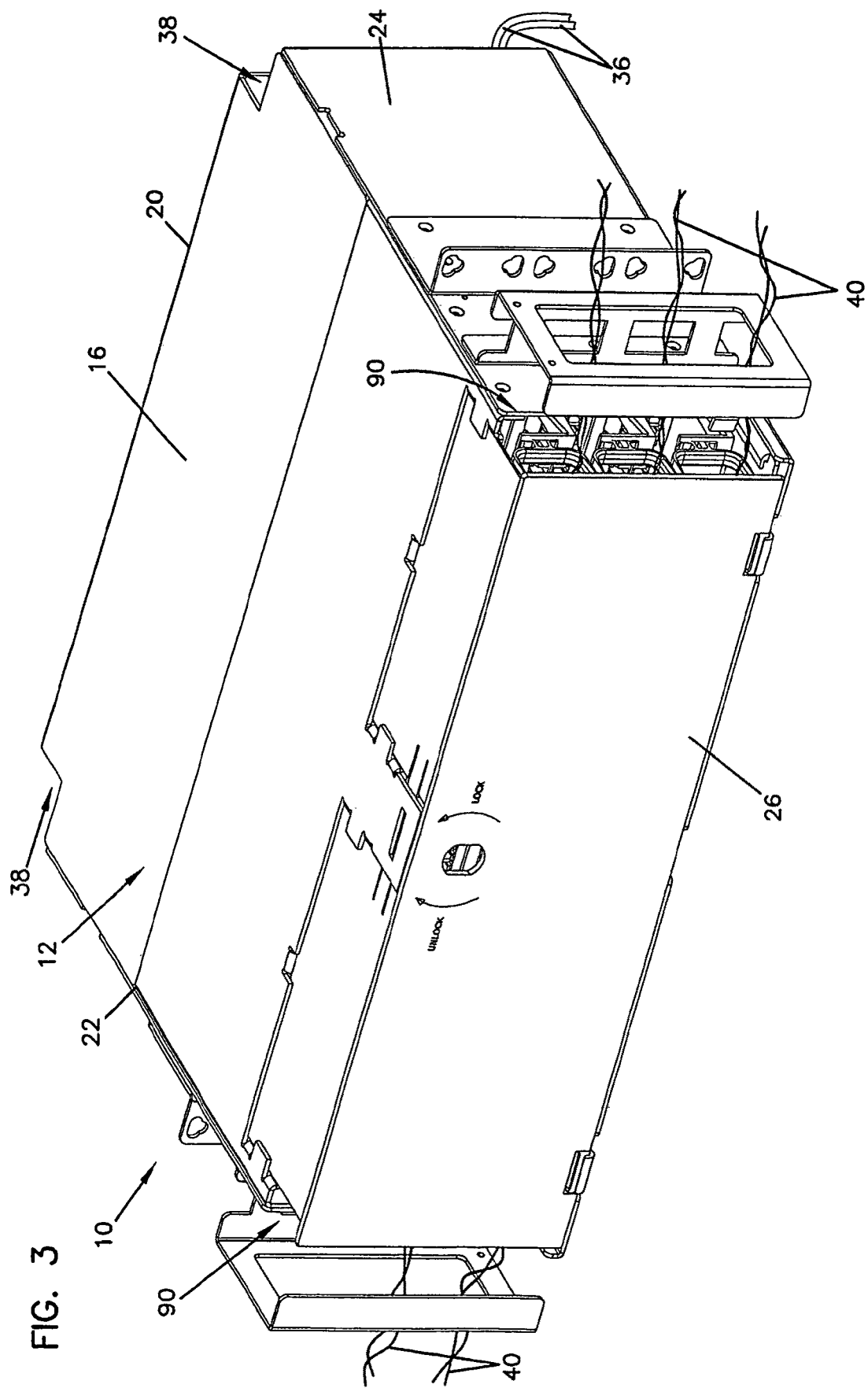
FIG. 3 is a front perspective view of the adapter panel arrangement of FIG. 2, shown with a cover of the arrangement closed.

The adapter panel arrangement 10 of the present disclosure generally includes a chassis 12 having an interior 14. The interior 14 is defined by a top wall 16, a bottom wall 18, a rear wall 20, and side walls 22, 24. The adapter panel arrangement 10 also includes a sliding drawer 34 that slides between an open position (FIG. 1) and a closed position (FIG. 2). A front cover 26 is attached to the sliding drawer 34. When the drawer 34 is in the closed position, the front cover 26 encloses the interior 14 of the chassis 12 when closed (FIG. 3) and provides access to the interior 14 when open (FIG. 2).

Referring now to FIGS. 1 and 2, the adapter panel arrangement 10 includes a framework structure 30 (FIG. 1) that is attached or mounted to the drawer 34. A panel of adapters 32 is mounted to the framework structure 30. As will be described in greater detail hereinafter, the drawer 34 is designed to slide outward from the chassis 12 primarily for installation purposes. That is, the drawer 34 can be slid to the open position during installation or assembly of the adapter panel arrangement, but is position in the closed position (FIG. 2) during operative use of the arrangement 10. During operative use, the framework structure 30 and the panel of adapters 32 are located within the interior 14 of the chassis 12 and the drawer 34 is in the closed position (FIG. 2). A user accesses the panel of adapters 32 from a front opening 28 of the chassis 12 without sliding the drawer 34 forward.

Referring again to FIG. 1, the panel of adapters 32 includes a face panel 42 that defines a number of openings 44 (only one shown). Adapters 46 are mounted within the openings 44. In the illustrated embodiment, the adapters are LC type adapters; however, other types of adapters, such as SC, ST, FC and MPO type adapters can also be used in accordance with the principles disclosed. Further, in the illustrated embodiment, the adapters 46 are blocked or grouped; each adapter block 58 including eight adapters 46 (four adapter pairs). Other number of adapters can be provided in an adapter block, such as four adapters (two adapter pairs), for example; the openings in the face panel 42 being correspondingly sized to receive the four-adapter blocks. Alternative, single adapters can be used and mounted with openings sized to receive the single adapters.

The openings 44 of the face panel 42 are arranged in rows; each row of mounted adapter blocks 58 defines an adapter array 48. What is meant by a row is that the openings 44 are arranged in a generally horizontal alignment, as opposed to being arranged in a column or in a vertical alignment; accordingly, the adapter arrays 48 are generally horizontal adapter arrays.

Figure 4:
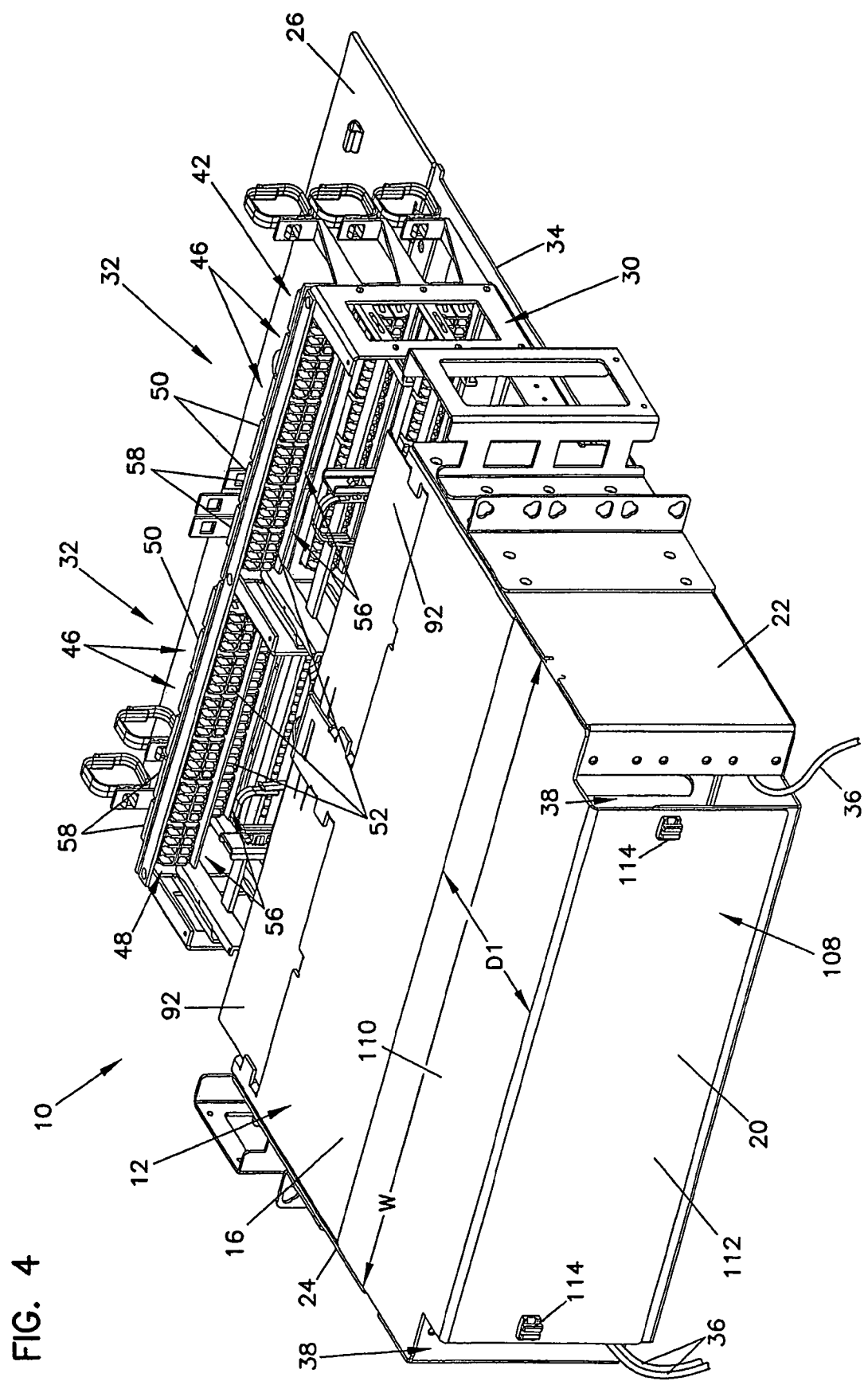
FIG. 4 is a rear perspective view of the adapter panel arrangement of FIG. 1.

Referring now to FIGS. 1 and 4, the adapters 46 of the adapter blocks 58 each includes a front connection end 50 (FIG. 1) and a rear connection end 52 (FIG. 4). When mounted within the openings 44, the front connection ends 50 of the adapters 46 are located toward the front opening 28 of the chassis 12, and the rear connection ends 52 of the adapters 46 are located toward the rear wall 20 of the chassis 12. The front connection ends 50 of the adapters 46 define open frontward cable connection locations 54 (FIG. 2) of the face panel 42. The rear connection ends 52 of the adapters 46 define open rearward cable connection locations 56 (FIG. 4) of the face panel 42.

What is meant by "open cable connection locations" are locations that are provided in an open region in the chassis 12, as opposed to a connection location that is enclosed within a housing or module, the housing or modules in turn being mounted within the chassis. That is, the panel of adapters 32 is a panel of unenclosed adapters 46 that are not enclosed relative to the other adapters 46 on the face panel 42. While the panel of adapters itself is enclosed within the chassis 12, the plurality of adapters 46, and each of the adapter arrays 48 are not enclosed separately from the other adapters 46 or the other adapter arrays 48.

Figure 5:
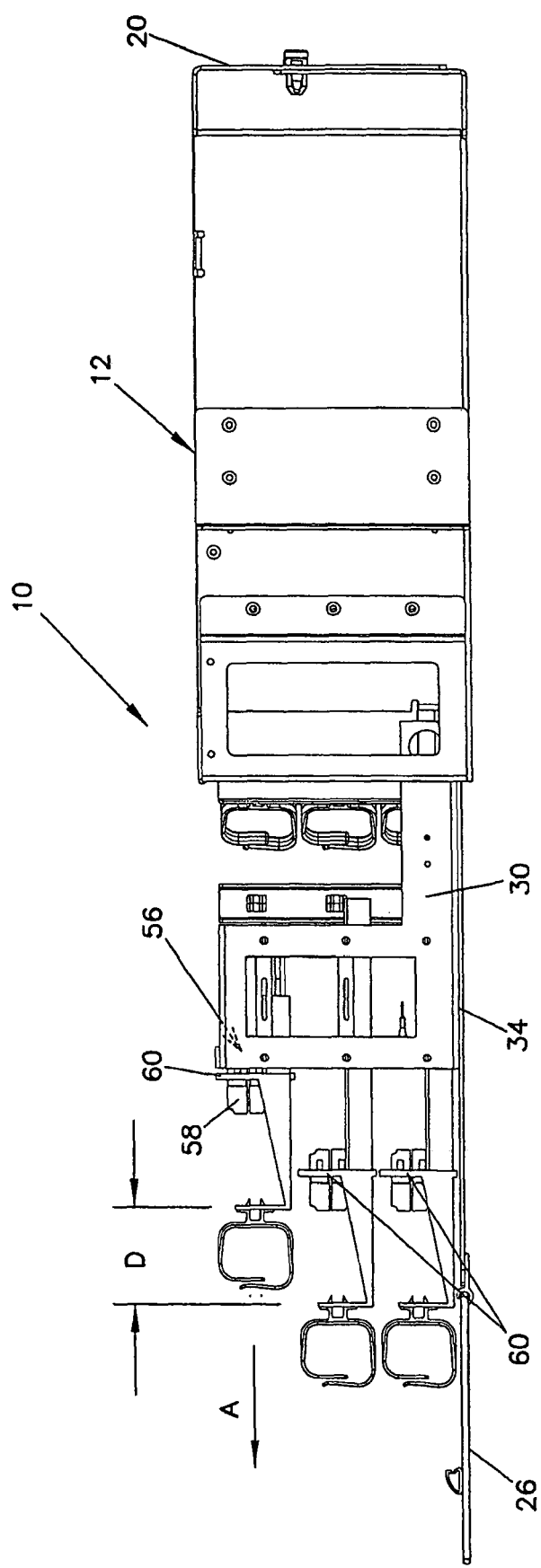
FIG. 5 is a side elevation view of the adapter panel arrangement of FIG. 4.
Figure 6:
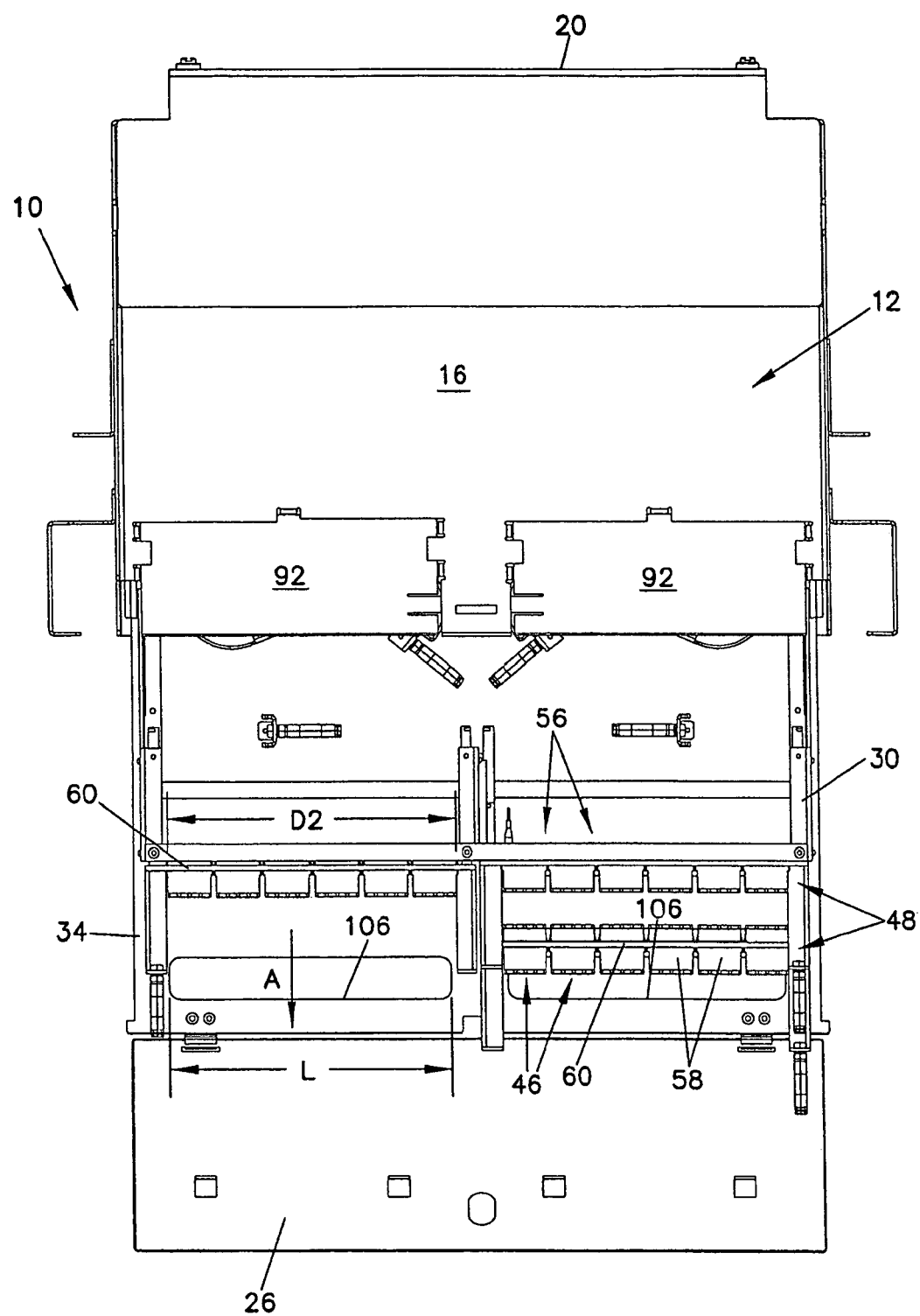
FIG. 6 is a top plan view of the adapter panel arrangement of FIG. 5.

Referring now to FIGS. 1, 5 and 6, the adapter arrays 48 of the face panel 42 are designed to slide in a lateral direction independent of other adapter arrays. In particular, the face panel 42 is defined by a number of separate panel sections 60. In the illustrated embodiment, each separate panel section defines one row of openings in which the blocks 58 of unenclosed adapters 46 are mounted, i.e., each panel section 60 contains one adapter array 48. In other embodiments, the panel sections can include, for example, two rows of openings that receive four-adapter blocks, for example; this panel section embodiment containing two adapter arrays.

The face panel 42 of the adapter panel arrangement 10 illustrated includes six panel sections 60—two panel sections 60 positioned side-by-side, and stacked three panel sections high (see FIG. 1). Each panel section 60 contains six blocks 58 having eight adapters 46 for a total of 288 frontward connection locations and rearward connection locations. Each separate panel section 60 is designed to selectively slide in a forward, lateral direction (A) independent of the other panel sections. The forward, lateral direction (A) is a direction extending between the front opening 28 and the rear wall 20, as opposed to a direction which is transverse to the bottom wall 18 of the chassis 12, for example.

Figure 7:
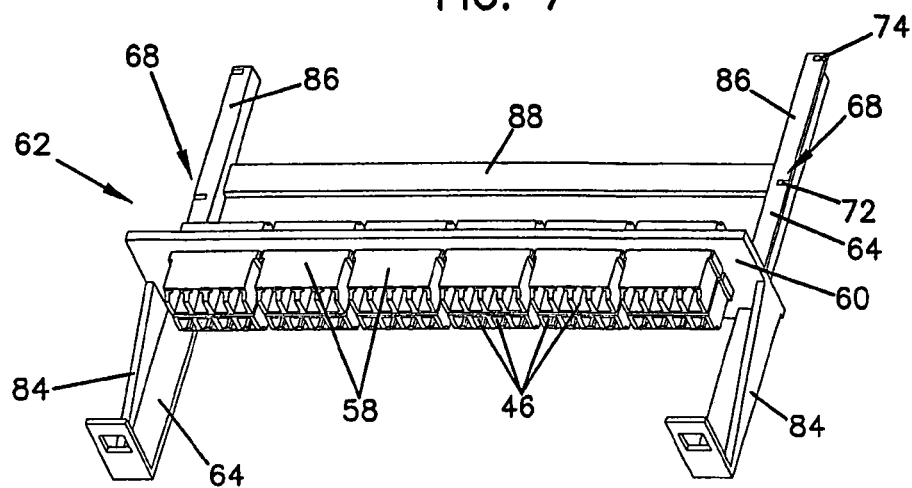
FIG. 7 is a top perspective view of one embodiment of a sliding frame piece and an adapter array of the adapter panel arrangement of FIG. 1, shown in isolation.
Figure 8:
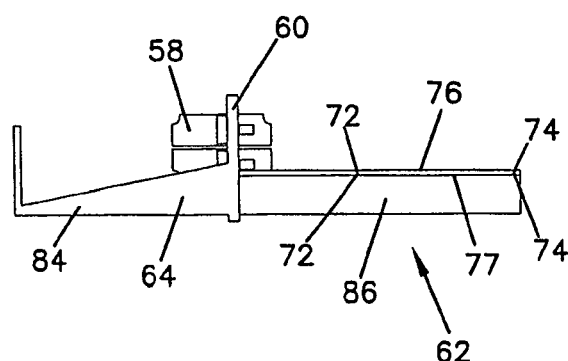
FIG. 8 is a side elevation view of the sliding frame piece and adapter array of FIG. 7.
Figure 9:
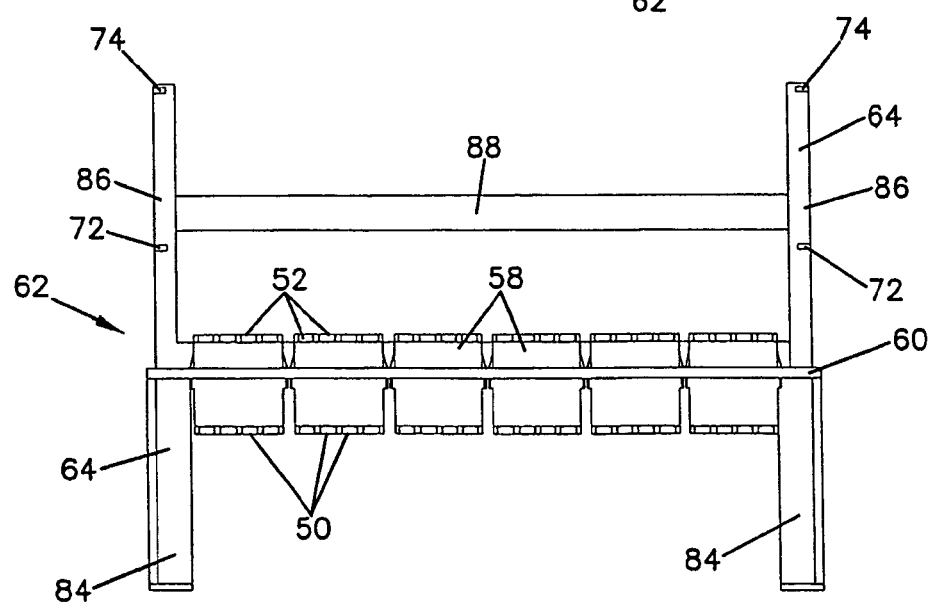
FIG. 9 is a top plan view of the sliding frame piece and adapter array of FIG. 7.

Referring to FIGS. 7-9, each separate panel section 60 of the panel of adapters 32 is attached to a sliding frame piece 62. The sliding frame piece 62 includes a pair of elongated rail members 64. In the illustrated embodiment, the elongated rail members 64 include a forward rail portion 84 that extends forwardly from the panel section 60, and a rearward rail portion 86 that extends rearwardly from the panel section 60. The sliding frame piece 62 can include a cross-support 88 to maintain the structural relationship of the rail members 64.

The pairs of elongated rail members 64 are arranged to engage and slide within pairs of guides 66 (one shown in FIGS. 10-12) that are mounted to the framework structure 30 (FIG. 1) of the arrangement 10. The rail members 64 and the guides 66 include a stop arrangement 68 that limits the sliding motion of the panel sections 60 between a rearward position (see the top panel section 60 in FIG. 5) and a forward position (see the bottom panel section 60 in FIG. 5).

Referring to FIGS. 9-12, the stop arrangement 68 (FIG. 12) is defined by at least one projection 70 (FIGS. 10 and 11) located on each guide 66 of the pair of guides, and first and second pockets or detents 72, 74 (FIG. 9) formed in the rail members 64. In the illustrated embodiment, two projections 70 (upper and lower projections) are provided on each of the guides 66. Correspondingly, upper and lower detents 72, 74 (see FIG. 8) are formed in the rearward rail portions 86 of the rail members 64. While the illustrated embodiment depicts the detents 72, 74 formed in the rail members 64 and the projections 70 provided on the guides 66, it is contemplated that the detents can be formed in the guides 66 and the projection correspondingly provided on the rail members 64.

Referring still to FIGS. 9-12, when the panel section 60 is positioned in the rearward position, the projections 70 of the guides 66 seat within the first detents 72 of the rail members 64 to retain the panel section 60 in the rearward position. The guides 66 are flexibly constructed so that when the panel section 60 is pulled forward, the projections 70 un-seat and slide along top and bottom surfaces 76, 77 (FIG. 8) of the rail members 64. Referring to FIG. 12, when the panel section 60 reaches the forward position, the projections 70 seat within the second detents 74 of the rail members 64. This stop arrangement 68 indicates to a user when the panel section 60 has reached the predetermined forward position, and similarly, the rearward position.

Referring back to FIG. 5, in general, the stop arrangement 68 provides an indication of when the panel section 60 has moved a lateral distance D forward from the rearward position to the forward position. In one embodiment, the lateral distance D is no more than about 4.0 inches forward from the rearward position. In the illustrated embodiment, the lateral distance D is about 1.7 inches. Providing such an indication to the user prevents the user from moving the panel section 60 a distance beyond that which cables interconnected to the panel section 60 will allow.

In particular, as previously described, the present panel arrangement 10 is designed such that the drawer 34 is intended to slide only during installation procedures, as opposed to post-installation or during operative use. Referring to FIG. 4, during installation, cables 36, such as fiber optic cables, are routed into the chassis 12 through rear openings 38 and terminated to the open rearward connection locations 56 of the face panel 42 (i.e., the rear connector ends 52 of the adapters 46).

The fiber optic cables 36 have a predetermined length that can be routed about cable storage spools or structures (see e.g., 78, 80 in FIG. 1). The predetermined lengths of the cables, however, do not have enough slack to accommodate drawer 34 movement during operative use, and the arrangement 10 does not have devices such as sliding radius limiters that take up or manage excessive movement of such cable slack.

In present panel arrangement 10, the predetermined lengths of the cables generally accommodate only the limited sliding movement of the panel sections 60. That is, while the drawer 34 may be slid out for purposes of installation, or for repairs requiring access to the region behind the panel of adapters 32, the drawer 34 is not intended to slide for purposes of accessing the panel of adapters 32 during operative use of the adapter panel arrangement 10. Operative use and access to the panel of adapters 32 is instead provided by the sliding movement of the panel sections 60 relative to the sliding movement of the drawer 34.

In general, the lateral sliding movement of the panel sections 60 provides access to the open cable connections (e.g., 54, 56) defined by the adapter arrays 48. Access to the open connection locations (e.g., 54, 56) of the face panel 42 is important in two primary instances: the first instance being during installation (e.g., during initial install or assembly, or during repair, replacement, or upgrade of the cable terminations at the rearward connection locations 56 of the panel 32); the second instance being after installation during operative use of the arrangement 10.

Referring back to FIGS. 1 and 4, during installation, the drawer 34 is pulled out to the open position. As previously described, a technician routes the fiber optic cables 36 through the rear openings 38 of the chassis 12 and terminates the cables to the open rearward connection locations 56 of the panel of adapters 32. To provide better access to the rear connection ends 52 of the adapters 46 defining the rearward connection locations 56, one of the adapter arrays 48 is positioned in the rearward position (e.g., the top array), while the remaining adapter arrays (e.g., the arrays located beneath the top array (see also FIGS. 5 and 6)) are positioned in the forward position. In this configuration, the technician has better access to the open rearward connection locations 56 of the one panel section 60 positioned in the rearward position. Once cable terminations to that particular adapter array 48 are complete, that adapter array can be slid forward and the next array to which cables are to be terminated slid rearward.

Referring to FIG. 4, to provide even further access to the open rearward connection locations 56, the top wall 16 of the chassis 12 includes removable access panels 92. Referring to FIG. 2, each of the panels 92 slides outward in a direction B from the top wall 16 of the chassis 12. In FIG. 2, the panels 92 are shown engaged with the top wall 16. In particular, each panel 92 is locked in place by a flexible tab 94 that engages a hem or roll 98 formed in a top wall portion 100 of the top wall 16. The flexible tab 94 is defined by slots 96 formed in the panel 92. The hem or roll 98 is formed by bending or rolling a section of the top wall 16 over on itself; although structure can be attached to the top wall as an alternative to providing a hem.

Figure 15:
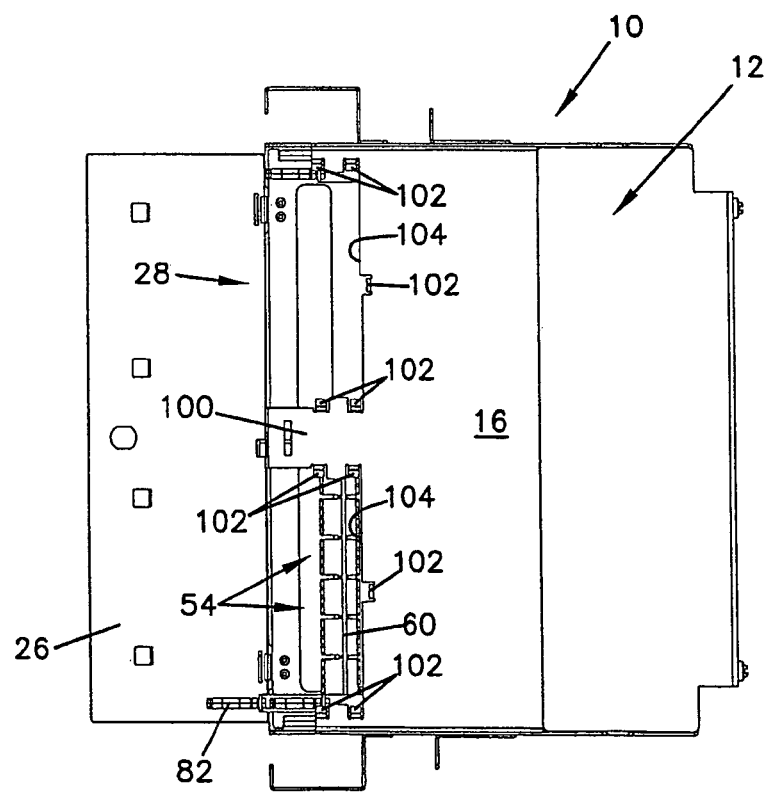
FIG. 15 is a top plan view of the adapter panel arrangement of FIG. 14.

To slide one of the panels 92 out, the flexible tab 94 is flexed downward beyond the hem or roll 98 formed in the top wall portion 100. The panel is then slid out in the direction shown in FIG. 2 and removed to define a top wall opening 104 (see e.g., FIG. 15) located adjacent to the front opening 28 of the chassis 12. The top wall opening 104 provides further access to the open rear connection locations 56. To re-attach the panel 92, the panel 92 is place in relation to the top wall opening 104, the flexible tab 94 is flexed downward, and the panel 92 is then slid back into place. As shown in FIG. 15, retaining flanges 102 are formed in the top wall 16 at the top wall openings 104. The retaining flanges 102 support the panels 92 when attached to the top wall 16 of the chassis 12.

The open rearward connection locations 56 are typically access only during installation procedures, with the exception of repairs or upgrades, for example. The open frontward connection locations 54, however, are accessed on a more regular basis to provide cross-connections between telecommunications equipment. Such use is referred to as operative use, or use that is post-installation and primarily involves maintaining or establishing cable terminations at the front connection ends 50 of the adapters 46.

Figure 13:
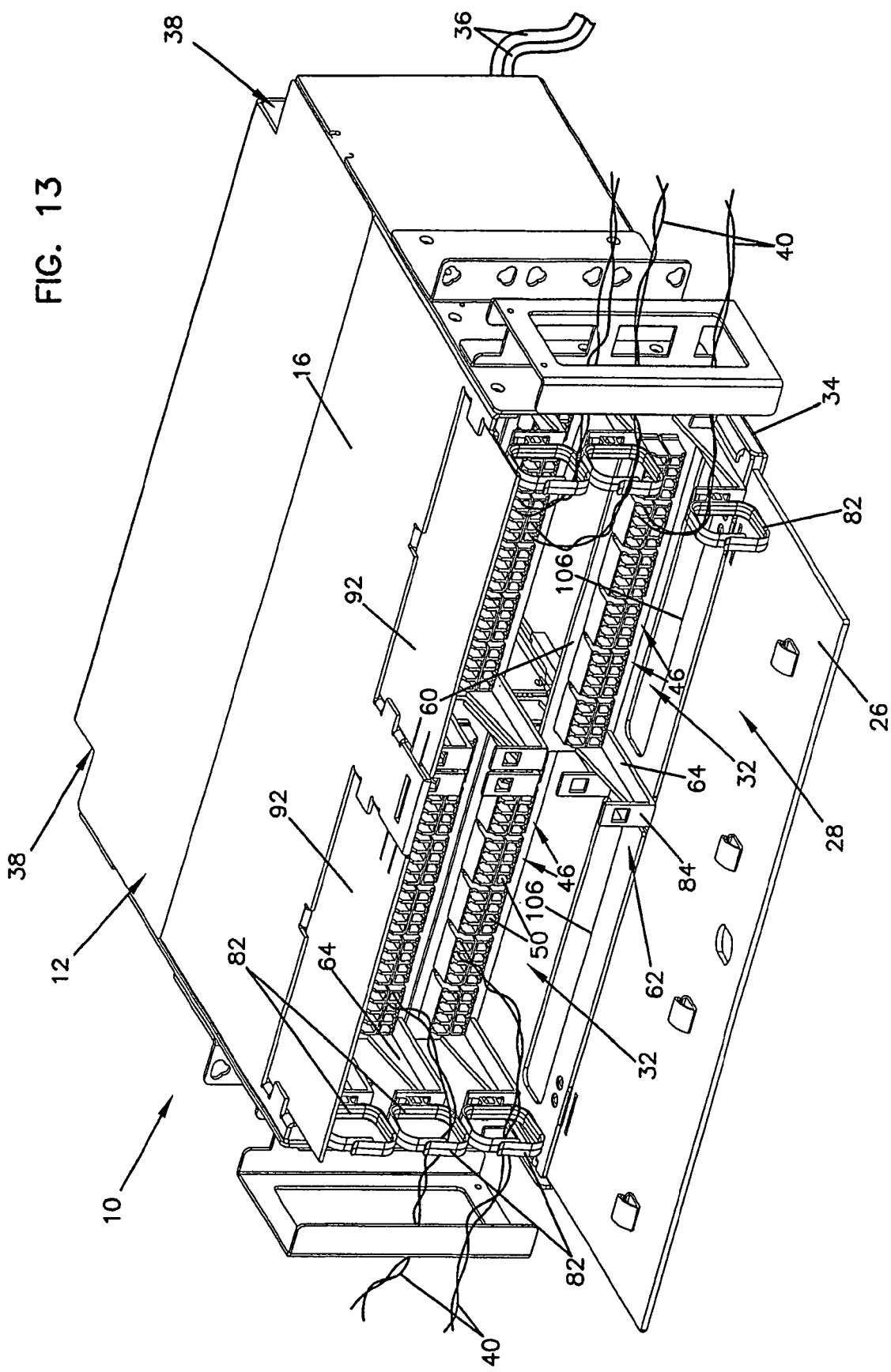
FIG. 13 is a front perspective view of the adapter panel arrangement of FIG. 2, shown with an adapter array positioned in a forward position.
Figure 14:
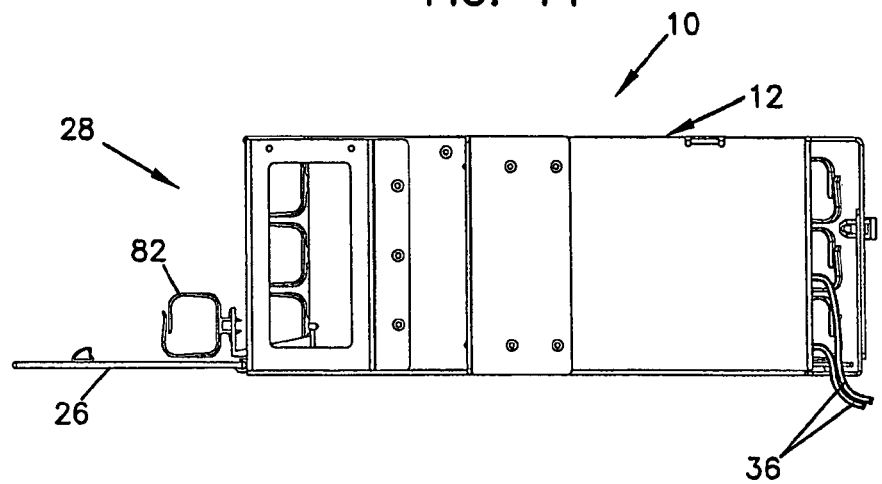
FIG. 14 is a side elevation view of the adapter panel arrangement of FIG. 13.

Referring now to FIGS. 13-15, the adapter panel arrangement 10 is shown in operative use. During operative use, the panel of adapters 32 is accessed through the front opening 28 of the chassis 12, with the drawer 34 positioned in the closed position.

As previously described, the cables 36 that enter the interior 14 of the chassis 12 through rear openings 38 are terminated to the open rear connection locations 56 of the panel of adapters 32. Referring to FIG. 13, jumper cables or patching cables 40 are also terminated to the panel of adapters 32; and in particular, to the open frontward connection locations 54 of the panel 32. The patching cables 40 provide the cross-connections between the adapter panel arrangement 10 and other telecommunications equipment (not shown). The patching cables 40 are routed from the front opening 28 and through side openings 90 (FIG. 3) of the chassis 12 to cable routing structure (e.g., channels, not shown) of the telecommunications system.

Because of the high-density arrangement of the adapters 46, each panel section 60 of the panel of adapters 32 slides forward to separate the associated adapter array 48 from the other arrays. By separately positioning the panel section 60 and the associated adapter array 48 forward, a technician can more easily grasp a particular connector of a patching cable 40, and/or more easily terminate a patching cable to a particular adapter 46 of the forwardly-positioned array. In addition, and as previously described, the access panels 92 (FIG. 13) of the top wall 16 can be removed (as shown in FIG. 15) to provide even further access to the open frontward connection locations 54 of the panel sections.

Referring again to FIG. 13, the forward rail portion 84 of the rail member 64 can be used as a handle to pull the panel section 60 forward. Alternatively, the user can slide the panel section 60 forward by grasping a retaining ring 82 attached to the rail member 64 of the sliding frame piece 62. In the illustrated embodiment, the retaining rings 82 are attached to the ends of outer rail members 64 of the sliding frame piece 62 to protect the patching cables 40 from exceeding a minimum bend radius.

Referring still to FIG. 13, additional access to the adapters 46 is provided through cut-outs or bottom access openings 106 located adjacent to the front opening 28 of the chassis. The bottom access openings 106 are formed in the drawer 34 of the chassis 12. As can be understood, the front connection end 50 of the adapters 46 on the lower-most panel section 60 can be difficult to access as finger space between the lower-most adapters and the drawer 34 is limited. To better access to those particular adapters during operative use, a technician simply slides the lower-most panel section 60 outward relative to the drawer 34 such the that lower-most panel section 60 is adjacent the cut-out or opening 106. The opening 106 provides additional finger space equal to the thickness of the drawer. In the illustrated embodiment, the addition finger space is approximately ¼ of an inch.

The bottom access openings 106 also provide better access to the lower-most adapters during installation or repair procedures. Referring to FIGS. 5 and 6, during an install, for example, a technician can slide the drawer 34 outward using the bottom access openings 106 as handles, slide the lower-most panel 60 outward adjacent to the bottom access opening 106 (FIG. 6), and then reach through the bottom access opening 106, from beneath the drawer 34, to access the front connection ends of the adapters on the lower-most panel. Referring to FIG. 6, in the illustrated embodiment, the bottom access openings 106 have a length L. Preferably, the length L spans a substantial majority of the distance D2 of which the plurality of adapters 46 span.

Referring back to FIG. 4, the present chassis 12 is also configured to provide access to the interior 14 of the chassis through the rear. In particular, the rear of the chassis 12 is partly defined by a removable rear chassis portion 108 that provides access to the chassis interior 14 when initially installing cables, for example. In the illustrated embodiment, the removable rear chassis portion 108 is a two-part chassis portion. A first part 110 of the removable rear chassis portion 108 partly defines the top wall 16 of the chassis, and a second part 112 defines the rear wall 20.

The rear chassis portion 108 is detachably secured to the remainder of the chassis 12 by latches 114. To access the interior 14 of the chassis 12, the rear chassis portion 108 is unlatched and removed. The first part 110 of the rear chassis portion 108 has a depth D1 that exposes the interior to provide access to interior cable routing areas. In the illustrated embodiment, the depth D of the part 110 of the chassis portion provides an exposed opening in the top wall that is at least about 5 inches. The exposed opening also extends the width W of the chassis (i.e., extends from one side wall 22 of the chassis to the other side wall 24). The exposed opening through the top wall 16, in addition to the removal of the rear wall 20 aids in routing cables within the interior of the chassis 12.

While the present disclosure is described with respect to use in a fiber optic application, the disclosed panel arrangement can be adapted for use in other applications. For example, in some applications, copper cables may be used exclusively from fiber optic cables; and accordingly various types of wire terminations or wire connectors can be provided on the face panel of the arrangement. Still, in other applications having hybrid cabling, or applications having both types of fiber optic and copper cabling, the face panel of the arrangement can be provided with a combination of fiber optic and copper connectors and/or adapters.

In general, the present adapter panel arrangement 10 provides a high-density adapter panel arrangement while facilitating access to otherwise crowded front and rear connection locations. Because of the access design of the present arrangement, the amount of space utilized on racks and cabinets is minimized; or, in the alternative, allows for expansion and upgrade of systems having spatial constraints, as more densely packed connection locations are provided without sacrificing effective access to the connection locations.

The above specification provides a complete description of the present invention. Since many embodiments of the invention can be made without departing from the spirit and scope of the invention, certain aspects of the invention reside in the claims hereinafter appended.

What is claimed is:

1. An adapter panel arrangement comprising:
a chassis body extending between opposite front and rear ends that are spaced apart from one another along a forward-rearward axis, the chassis body also extending along a width between opposite first and second sidewalls, the front end of the chassis body defining an opening providing access to an interior of the chassis body from the front end of the chassis body;
a sliding member mounted to the chassis body to slide along the forward-rearward axis between a first position disposed within the interior of the chassis body and a second position disposed at least partially outside of the chassis body; and
a plurality of optical adapters carried by the sliding member when the sliding member slides between the first and second positions, the optical adapters being located within the interior of the chassis body during operative use of the adapter panel arrangement, the optical adapters being accessible from the front end and the rear end of the chassis body, the optical adapters defining groups of front adapter ports, each group being separately removable from the sliding member.

2. The adapter panel arrangement of claim 1, wherein the chassis body includes a removable rear portion, the removable rear portion covering an opening at the rear end of the chassis body when coupled to the chassis body, the opening providing access to the interior of the chassis body from the rear end of the chassis body when the rear portion is removed from the chassis body.

3. The adapter panel arrangement of claim 1, wherein the adapter panel arrangement is configured to be disposed on a rack.

4. The adapter panel arrangement of claim 1, wherein each of the groups includes an array of front adapter ports.

5. The adapter panel arrangement of claim 1, wherein each group of adapter ports is defined by a single multi-port adapter block.

6. The adapter panel arrangement of claim 1, wherein the plurality of optical adapters extends in a first row along the width of the chassis body.

7. The adapter panel arrangement of claim 6, wherein the first row is associated with a fiber optic routing element that includes successive material sections extending frontward and upward to permit optical fibers to be routed away from the front adapter ports towards one of the first and second sidewalls of the chassis body.

8. The adapter panel arrangement of claim 7, wherein the first row is associated with a respective pair of fiber optic routing elements.

9. The adapter panel arrangement of claim 1, wherein a second row of optical adapters extends along the width of the chassis.

10. The adapter panel arrangement of claim 9, wherein each of the first and second rows is associated with a respective fiber optic routing element that includes successive material sections extending frontward and upward to permit optical fibers to be routed away from the front adapter ports towards one of the first and second sidewalls of the chassis body.

11. An adapter panel arrangement comprising:
a chassis body extending between opposite front and rear ends that are spaced apart from one another along a forward-rearward axis, the chassis body also extending along a width between opposite first and second sidewalls, the front end of the chassis body defining an opening providing access to an interior of the chassis body from the front end of the chassis body;
a sliding member mounted to the chassis body to slide along the forward-rearward axis between a first position disposed within the interior of the chassis body and a second position disposed at least partially outside of the chassis body; and
a plurality of termination components carried by the sliding member when the sliding member slides between the first and second positions, the termination components being accessible from both the front end of the chassis body and the rear end of the chassis body, each termination component having a plurality of front ports, and each termination component being separately removable from the sliding member.

12. The adapter panel arrangement of claim 11, wherein the chassis body includes a removable rear portion that covers an opening at the rear end of the chassis body when coupled to the chassis body, the rear portion blocking access to the interior of the chassis body from the rear end of the chassis body when covering the opening at the rear end of the chassis body, the opening at the rear end of the chassis body providing access to the interior of the chassis body from the rear end of the chassis body when the rear portion is removed from the chassis body.

13. The adapter panel arrangement of claim 12, wherein the rear portion includes a rear wall and a top wall.

14. The adapter panel arrangement of claim 11, wherein the front ports of each termination component are disposed in an array.

15. The adapter panel arrangement of claim 11, wherein the termination components are disposed in a row along the width of the chassis body.

16. The adapter panel arrangement of claim 15, wherein the row is one of a plurality of rows, each row extending along the width of the chassis body, each row including a plurality of termination components.

17. The adapter panel arrangement of claim 11, wherein each termination component is defined by a single multi-port adapter block.

18. The adapter panel arrangement of claim 11, wherein each termination component includes eight front ports.

19. The adapter panel arrangement of claim 16, wherein each row is associated with a respective fiber optic routing element that includes successive material sections extending frontward and upward to permit optical fibers to be routed away from the front ports towards one of the first and second sidewalls of the chassis body.

20. The adapter panel arrangement of claim 11, wherein the adapter panel arrangement is configured to be disposed on a rack.

* * * * *